United States Patent [19]

Massey

[11] 3,963,259

[45] June 15, 1976

[54] SLIDING AXLE ASSEMBLY FOR FLAT DECK TRAILERS AND THE LIKE

[76] Inventor: Navarre A. Massey, 542 River Drive, Fort Macleod, Alberta, Canada

[22] Filed: Apr. 29, 1975

[21] Appl. No.: 572,731

[30] Foreign Application Priority Data

Oct. 22, 1974   Canada ................................ 211924

[52] U.S. Cl. ................................ 280/80 B; 280/682
[51] Int. Cl.² ...................... B60G 5/06; B62D 53/06
[58] Field of Search ......... 280/80 B, 104.5 B, 124 R

[56] References Cited
UNITED STATES PATENTS

| | | | |
|---|---|---|---|
| 3,048,421 | 8/1962 | Matlock | 280/80 B |
| 3,372,946 | 3/1968 | Hutchens | 280/80 B |

Primary Examiner—Philip Goodman
Attorney, Agent, or Firm—Stanley G. Ade

[57] ABSTRACT

Two spaced and parallel V tracks are secured to the underside of a trailer body and engaging a plurality of rollers having V grooves therein which are mounted upon the main undercarriage frame thus facilitating easy movement and adjustment of the undercarriage relative to the trailer body. Locking means are provided at intervals between the undercarriage and the trailer body so that the two may be locked together in a plurality of selective positions. This construction keeps the undercarriage in true alignment with the trailer frame without the need for side thrust rollers or guides. Furthermore the V tracks maintain engagement with the V rollers due to the weight of the trailer frame.

2 Claims, 4 Drawing Figures

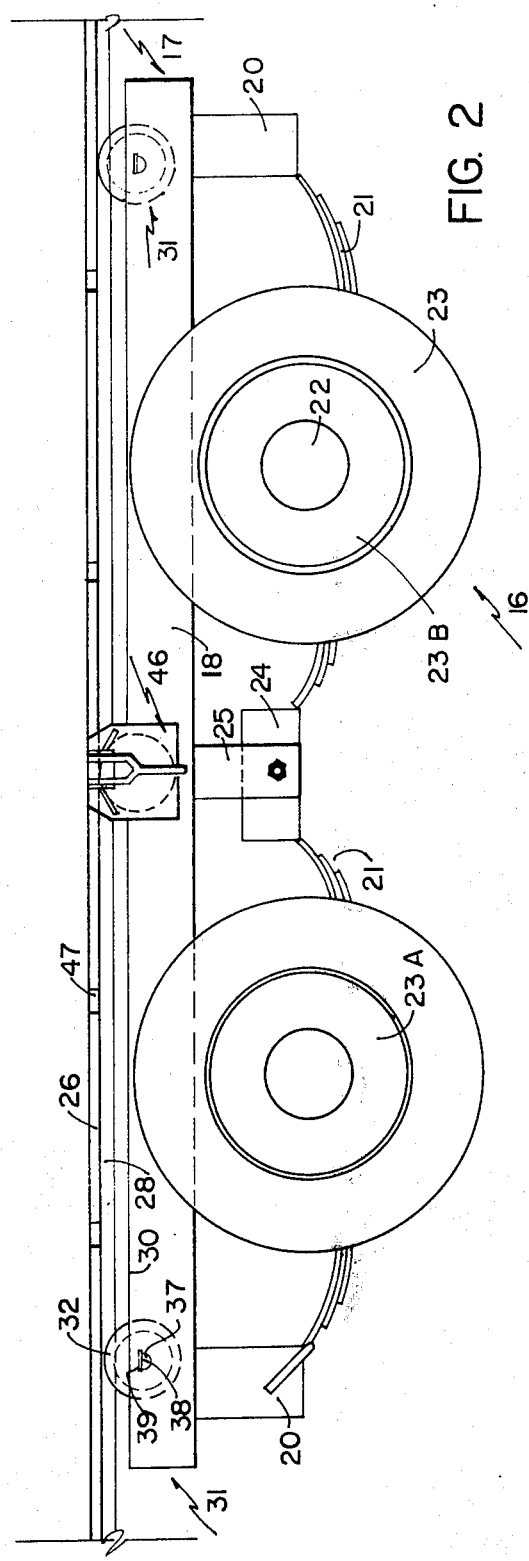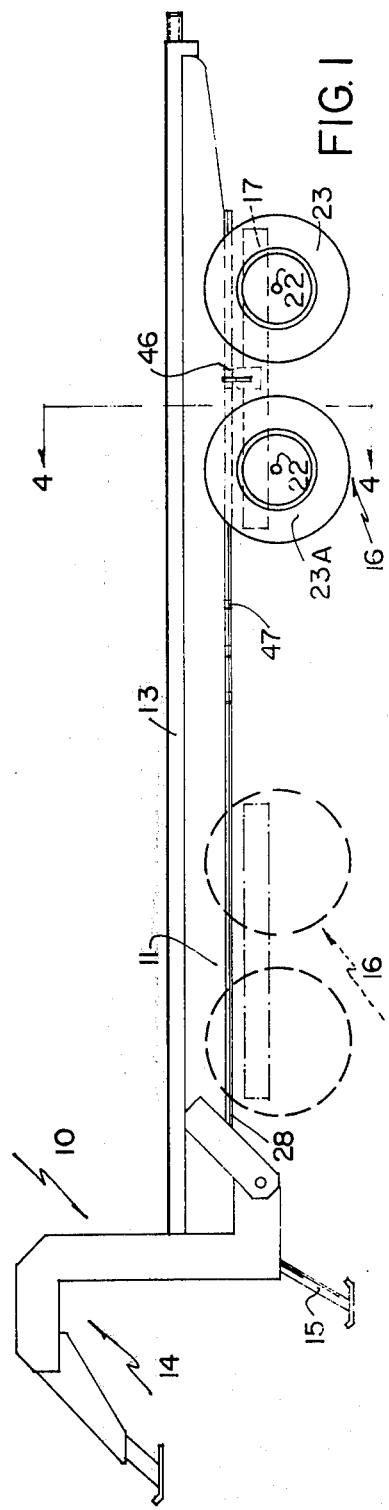

3,963,259

SLIDING AXLE ASSEMBLY FOR FLAT DECK TRAILERS AND THE LIKE

BACKGROUND OF THE INVENTION

This invention relates to new and useful improvements in sliding axles for trailers.

Usually such trailers are of the fifth wheel variety and include an undercarriage which is adapted for sliding movement relative to the trailer so that the trailer can be tipped rearwardly for easy loading and can then be repositioned thus levelling the trailer and load.

Such devices usually include relatively complicated mechanisms, particularly the mechanism between the undercarriage and the trailer and are not only costly to produce, but often jam due to dirt and the like interferring between the rolling or sliding compongents. As an example side thrust rollers or guides are usually required to maintain alignment between the undercarriage and the trailer frame.

SUMMARY OF THE INVENTION

The present invention overcomes these disadvantages by providing a relatively simple V type track engaging V grooved rollers on the undercarriage, it being understood that the tracks are secured to the underside of the trailer.

This permits easy relative movement therebetween so that the trailer is readily positioned as desired.

A locking device is provided between the trailer and undercarriage so that it can be locked in any one of a plurality of positions thus facilitating the loading and transportation of loads with the trailer.

The principal object and essence of the invention is to provide a device of the character herewithin described which permits a relatively simple, economical and readily adjustable mounting means between a trailer and a sliding undercarriage and which eliminates the need for side thrust rollers or guides by providing a construction which maintains the undercarriage in true alignment with the trailer frame during relative movement.

Another object of the invention is to provide a device of the character herewithin described which includes locking means which may be engaged between the trailer and the carriage in any one of a variety of selected positions.

A still further object of the invention is to provide a device of the character herewithin described which includes means to limit the upward movement of the trailer relative to the undercarriage thus retaining the two in the desired relationship one with the other.

Another object is to provide V rollers and tracks on the undercarriage and frame thus providing more bearing surface therebetween. This would be present with a conventional roller having the same diameter. This gives less wear and better traction when rolling the frame relative to the undercarriage.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a side elevation of the trailer and undercarriage per se.

FIG. 2 is a fragmentary side elevation of the undercarriage assembly and part of the trailer enlarged with respect to FIG. 1.

In the drawings like characters of reference indicate corresponding parts in the different figures.

DETAILED DESCRIPTION

Figure 4:
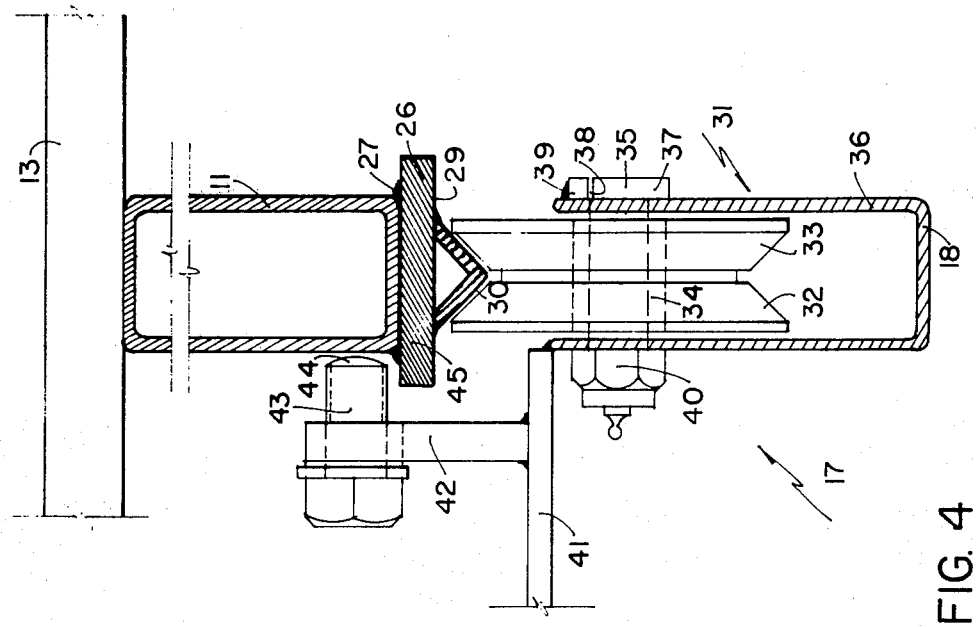
FIG. 4 is an enlarged partially sectioned view showing the rolling connection between the trailer and undercarriage.
Figure 3:
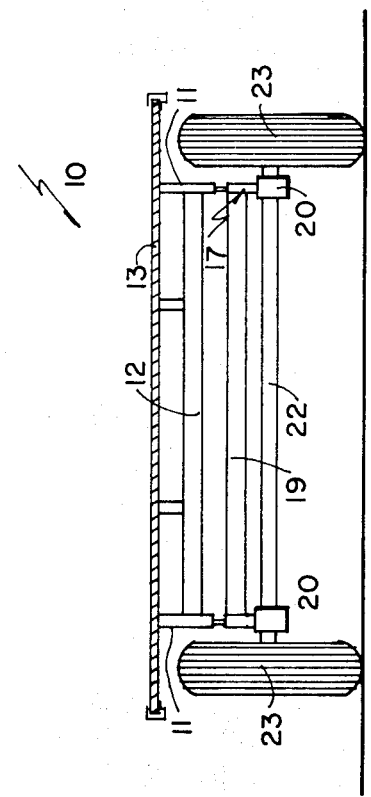
FIG. 3 is a partially schematic end view of the trailer and undercarriage.

Proceeding therefore to describe the invention in detail, reference to FIG. 1 will show a trailer collectively designated 10 having a pair of spaced and parallel main chassis members 11 together with secondary transverse framing members 12, and having a wooden deck 13 secured to the upper sides of the main chassis members 11 in the usual way.

The front end of the trailer is provided with the goose neck connection collectively designated 14 and includes a retractable support 15 all of which is conventional.

FIG. 2 shows details of the undercarriage collectively designated 16. It includes a substantially rectangular undercarriage frame collectively designated 17 comprising a pair of spaced and parallel U-shaped frame members 18 together with cross members 19 secured between the undercarriage members 11.

Spring shackles 20 depend from the members 18 and carry springs 21 which in turn are secured to wheel axle 22 having ground engaging wheels 23 journalled for rotation thereon in the usual manner.

In the present embodiment, there are two sets of wheels 23, a forward set 23A and a rear set 23B and the springs 21 of each set are connected by the inner ends thereof to spring equalizer plates 24 pivotally secured to central hanger plates 25.

Means are provided to mount the trailer 10 upon the undercarriage 16 for relative sliding movement therebetween parallel to the longitudinal axis of the trailer and details of this mounting are shown in FIG. 4.

A longitudinally extending flange plate 26 is secured as by welding 27 to the underside of each of the trailer frame members 11 and a longitudinally extendng right-angled angle iron member 28 is secured by the edges thereof, to the underside 29 of the flange plate 26 with the apex portion 30 of the angle iron member facing downwardly thus forming, in conjunction with a portion of the flange plate 26, an inverted triangular rail.

Fore and aft pairs of rollers are provided collectively designated 31.

Each roller assembly includes roller 32 having a V shaped groove 33 formed around the periphery thereof. Each roller is mounted upon a bearing 34 which in turn is supported upon a roller pin 35 engaging through and being supported by the side flanges 36 of the longitudinally extending undercarriage frame members 17.

The cross sectional configuration of the V shaped grooves 33 is similar to the cross sectional configuration of the angle iron portion 28 of the tracks so that these angle iron portions 28 ride in the rollers as clearly illustrated in FIG. 4. This permits relative sliding movement between the undercarriage and the trailer in a longitudinal direction.

It will be noted that the head 37 of the roller pin 35 is provided with a flattened portion 38 engaging under a locking bar 39 welded to one side plate 36 of the undercarriage member 17 thus preventing rotation of this pin when self-locking nut and grease nipple assembly 40 is engaged upon the other end of the pin.

Means are provided to prevent upward disengagement of the trailer from the undercarriage and takes the form of an off-standing member 41 welded to the upper edge of one of the side plates 36 of the undercarriage members 17. A bracket 42 extends upwardly from plate 41 and a retaining pin 43 extends inwardly through the bracket 42 and is locked in position by being screw threadably engaged through an aperture in the bracket 42.

The inner end 44 of this pin engages over the extending portion 45 of the flange plate 26 and prevents or limits the upward movement of the trailer relative to the undercarriage.

Means are provided to selectively lock the undercarriage in various positions relative to the trailer and although the specific method of locking does not form part of the invention nevertheless reference character 46 shows one embodiment which includes a spring loaded pin selectively engageable in any one of a plurality of locking slots 47 formed in the underside of the trailer longitudinal members 11, it being understood that the pin and locking device 46 are secure, in this embodiment, to the undercarriage.

Due to the ease of relative movement between the undercarriage and the trailer when the locking device 46 is disengaged, operation of the device is relatively simple.

The locking mechanism 46 is first unlocked and the trailer brakes are applied in the usual way.

The towing vehicle, (not illustrated) backs up or moves ahead while the undercarriage remains stationary thus allowing the trailer for example, to be tipped rearwardly for easy loading and then to be moved forwardly together with the load once again to the level position. When the undercarriage is in the correct position relative to the load and towing parameters, the locking device 46 is once again engaged.

From the foregoing it will be appreciated that the V roller and V track arrangement maintains the undercarriage and frame in true alignment during movement without side thrust rollers or guides. And because of the weight of the trailer, the tracks lie in the V rollers thereby automatically aligning the assembly.

Furthermore the V roller configuration affords more bearing surface than a conventional roller of the same diameter. This has two advantages; firstly there is less weight and flattening of the track and secondly, better traction is provided when rolling the frame along the undercarriage.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a trailer having an adjustable undercarriage which includes a double axle wheel bogie assembly; the improvement which comprises means to mount said trailer upon said undercarriage for selective sliding movement therebetween, said means including a pair of spaced and parallel tracks secured to the under of said trailer, a plurality of roller assemblies journalled for rotation upon the upper side of said undercarriage, locking means selectively cooperating between said trailer and said undercarriage to detachably lock said trailer to said undercarriage in the desired relationship, and means to retain said trailer upon said undercarriage for relative rolling movement therebetween parallel to the longitudinal axis of said trailer, said track comprising a planar longitudinally extending flange plate secured to the underside of said trailer, a longitudinally extending angle iron including a pair of side flanges and an apex portion at the junction thereof, said angle iron being secured by the side edges thereof to the underside of said flange plate thus forming a triangular configuration when viewed in cross section, said apex portion of said angle iron facing said undercarriage, said rollers having a V groove around the periphery thereof with a cross sectional configuration similar to the cross sectional configuration of said angle iron, said apex portion and part of said side flanges of said angle iron, engaging said grooves.

2. The invention according to claim 1 in which said means to retain said trailer upon said undercarriage includes means extending inwardly from said undercarriage and spaced above said flange plate thereby limiting the upward movement of said trailer relative to said undercarriage.

* * * * *